Patented Aug. 29, 1933

1,924,524

UNITED STATES PATENT OFFICE 1,924,524

PROCESS OF TREATING TUNG OIL

William B. Stoddard, Stamford, Conn., Theodore H. Geiger, New York, N. Y., and Lothian M. Burgess, Shrewsbury, Mass., assignors, by mesne assignments, to Tung Oil Products, Inc., a corporation of New Jersey No Drawing. Application March 10, 1931
Serial No. 521,516

5 Claims. (Cl. 87—12)

Our invention relates to a process of treating tung oil or China wood oil for varnishes, paints, enamels and similar covering compositions, and to an improved tung oil for these purposes.

Tung oil or China wood oil has certain characteristics that are very desirable for paints and varnishes, among others being that films formed from tung oil are very hard and resistant to water, even to hot or boiling water. Untreated tung oil, however, does not have sufficient body of itself to form a desirable paint or varnish vehicle and, in consequence, paints, enamels and varnishes made with tung oil alone tend to wrinkle and check when spread in a film or coating and allowed to dry.

Body may be imparted to tung oil by holding the oil at a moderately elevated temperature for a considerable period of time, but a long continued heating is required—a matter of several days. If higher temperatures are employed in order to shorten the time, the polymerization reactions which produce the bodying effect, and which are exothermic in their nature, spontaneously raise the temperature so rapidly and to such an extent that the reaction gets out of control and a valueless solidified or gellatinized material results.

In practice, these difficulties are overcome by conducting the bodying reaction or operation in the presence of linseed oil, the latter constituting about 50-60% of the total oil mixture, or of other oils or of resins and other diluents. The presence of linseed oil, and of some of the other diluents, not only increases the cost of the resulting product, being more expensive than tung oil, but also masks or diminishes by its presence the desirable characteristics of the latter.

An object of our invention is to provide a substantially pure tung oil of sufficient body to enable it to constitute a satisfactory vehicle for paints and enamels and, in addition, to provide an improved tung oil that is quick drying and that does not wrinkle, check or frost in air; and, moreover, to provide such an improved tung oil that forms a film which when dried, is not penetrable by tar paints or paint solvents.

Other objects of the invention are to provide a process of giving tung oil a body without the necessity of diluting it with linseed oil or the other materials now commercially used; of giving the tung oil a body in a short period of time; of increasing the speed of drying of the resulting tung oil product and, in general, in increasing its suitability for use as a varnish or a paint or an enamel vehicle.

In imparting body to the tung oil in accordance with our process the reaction is hastened and its time reduced by the use of a catalyst. Catalytic methods heretofore known for coagulating or solidifying tung oil are unsuitable for our present purpose because when the reactions of such former methods have once been set in action, they become uncontrollable and continue their action with such speed and vigor that solidified or coagulated masses are formed before the reaction can be terminated or checked. The coagulated or solidified masses thus formed by such uncontrollable catalysis are not soluble in tung oil nor in the solvents generally employed in the varnish, paint, enamel and like industries and, therefore, cannot be used to form suitable varnish or paint vehicles.

A further object of our invention is, therefore, to provide a catalytic process of imparting body to tung oil or increasing its body without coagulating or solidifying it, and one in which the reaction may be controlled and terminated to give the oil the body and character suitable for a varnish or paint vehicle.

Further objects and purposes of the invention will be apparent from the following specification.

In our process the treatment of the tung oil to give it increased body is hastened by the use of a small quantity of zinc chloride or a similar chloride which of itself or in the proportions and under the conditions employed has mild polymerizing properties.

The action of these milder chlorides at a somewhat elevated temperature is to polymerize or otherwise modify the oil to give it the desired body. The action is sufficiently slow, however, that it does not become uncontrollable and may if necessary be easily checked and stopped at the desired point by chilling. The chloride is preferably incorporated in the tung oil to be treated by means of a suitable vehicle such as acetone or other mutual solvent or in a water solution which is then emulsified with the oil. To further increase the speed of reaction of the chloride with tung oil, a small percentage of salicylic acid may be added also. The action of the salicylic acid may supplement the catalytic action of the chloride, and does make possible the use of a considerably smaller proportion of the chloride catalyst or the completion of the reaction in a much shorter time than when the usual proportion of chloride is used.

There may also be added to the tung oil a small quantity of unsaturated or drying fatty acids such as those obtainable from tung oil, linseed oil, perilla oil or menhaden oil. Preferably the total acids of a drying oil such as linseed oil are employed for this purpose. The presence of these unsaturated fatty acids or mixtures of unsaturated and drying fatty acids is a further aid in preventing the checking of the films of the varnish made from the treated tung oil, to prevent it from frosting in air and to decrease the tendency of the films of varnish or paint to wrinkle on drying.

The following are examples of specific methods of treating tung oil:

I

A quantity of tung oil is heated with a quantity of anhydrous zinc chloride equal to about 0.3% of the weight of the oil, the zinc chloride having been first dissolved in acetone. The acetone serves to dissolve the zinc chloride, and being itself soluble in tung oil, brings the zinc chloride into intimate contact with the oil. The mixture is heated to about 125° C. and maintained at this temperature for about an hour. A gentle but thorough agitation of the oil and zinc chloride may be maintained during the heating. During this heating the acetone may be volatilized either entirely or to a large extent. After the period of heating is completed, the oil is cooled rapidly to prevent further polymerization and to control the quality of the product. If the above mixture is maintained at a temperature of about 140° C., the reaction is completed in about 45 minutes.

II

A quantity of tung oil is heated with 0.1% of its weight of zinc chloride dissolved in an acetone solution. An amount of the total acids of linseed oil equal to about 5% of the weight of the tung oil is also added. The mixture is heated to 175° C., and maintained at this temperature for about three and one-half hours with a slow but thorough agitation. The product is then cooled or chilled rapidly to stop the reaction. For preparing varnishes this oil may, if desired, be cut hot or cold, and various solutions of driers, gums, resins, etc., added.

III

A quantity of tung oil is heated to about 150° C. with 0.1% of its weight of zinc chloride dissolved in acetone and with 1% salicylic acid. The heating is continued for about three and one-half hours or for a period short of that at which the oil would become thickened to such an extent as would render it valueless. The oil is then rapidly cooled or chilled to stop the reaction. It may be cut either hot or cold in mineral spirits and combined with pigments, driers, etc., to form a paint.

Through the above processes a tung oil, either alone or mixed with other oils, may be given a body that will render it suitable for use as a varnish, paint or enamel vehicle without impairing the desirable characteristics inherent in the tung oil itself.

It will be understood that the thickening may be carried to any desired degree short of that at which coagulated or solid masses are formed and which would render the resulting oil unsuitable for its intended purpose.

An oil thus treated is particularly advantageous for use as a vehicle for a priming coat on metal work because the solvents or tar paints employed on subsequent coats do not penetrate it nor cause it to flake away from the metal.

What we claim is:

1. A process of treating tung oil which comprises heating said oil in the absence of reaction retarding diluents and of compounds that combine with said oil with a small quantity of zinc chloride and with a peroxide until the body of said tung oil has increased, and terminating said treatment before the oil has coagulated or solidified.

2. A process of treating tung oil which comprises heating said oil in the absence of reaction retarding diluents and of compounds that combine with said oil with a small quantity of zinc chloride and with the unsaturated acids of the drying oil until said oil has increased in body, and chilling this oil mixture before it has coagulated or solidified.

3. A process of treating tung oil which comprises heating the tung oil in the absence of reaction retarding diluents and of compounds that combine with said oil with a small quantity of zinc chloride and with the total acids of linseed oil until the body of said tung oil has increased, and chilling said oil before it has coagulated or solidified.

4. A process of treating tung oil which comprises heating said oil in the absence of reaction retarding diluents and of compounds that combine with said oil with a small quantity of zinc chloride and acetone peroxide in an acetone solution at 125° C. until the body of said oil has increased, and chilling said oil before it has coagulated or solidified.

5. A process of treating tung oil which comprises heating said oil in the absence of reaction retarding diluents and of compounds that combine with said oil with a small quantity of zinc chloride and acetone peroxide in an acetone solution at 125° C. until the body of said oil has increased, adding the total acids of linseed oil equal to about 5% of the weight of said tung oil, and chilling said oil before it has coagulated or solidified.

WILLIAM B. STODDARD.
THEODORE H. GEIGER.
LOTHIAN M. BURGESS.